(12) United States Patent
Chang et al.

(10) Patent No.: US 12,544,736 B2
(45) Date of Patent: Feb. 10, 2026

(54) SELECTIVE METAMATERIAL ABSORBER AND METHOD FOR FABRICATING THE SAME

(71) Applicants: Jui-Yung Chang, Taipei (TW); Sydney Taylor, Charlestown, RI (US); Liping Wang, Chandler, AZ (US)

(72) Inventors: Jui-Yung Chang, Taipei (TW); Sydney Taylor, Charlestown, RI (US); Liping Wang, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 729 days.

(21) Appl. No.: 17/945,597

(22) Filed: Sep. 15, 2022

(65) Prior Publication Data
US 2023/0330631 A1 Oct. 19, 2023

Related U.S. Application Data

(60) Provisional application No. 63/244,693, filed on Sep. 15, 2021.

(51) Int. Cl.
*B01J 20/00* (2006.01)
*B01J 20/02* (2006.01)
*B01J 20/28* (2006.01)
*B01J 20/32* (2006.01)
(Continued)

(52) U.S. Cl.
CPC ....... *B01J 20/3236* (2013.01); *B01J 20/0218* (2013.01); *B01J 20/0251* (2013.01); *B01J 20/28035* (2013.01); *B01J 20/3204* (2013.01); *B82Y 30/00* (2013.01); *B82Y 40/00* (2013.01); *B01J 2220/4806* (2013.01)

(58) Field of Classification Search
CPC ............... B01J 20/3236; B01J 20/0218; B01J 20/0251; B01J 20/28035; B01J 20/3204; B01J 2220/4806; B82Y 30/00; B82Y 40/00
USPC ........................................................ 502/407
See application file for complete search history.

(56) References Cited

U.S. PATENT DOCUMENTS

2020/0191655 A1* 6/2020 Carr ..................... H10N 10/855

OTHER PUBLICATIONS

Chang, J.Y., Taylor, S., McBurney, R., Ying, X.U., Allu, G., Chen, Y.B., Wang, L.P., "Enhancing Solar Thermal Energy Conversion with Wavelength-Selective SiliconCored Tungsten Nanowife Metamaterial Absorbers," iScience, 2021, 24, 101899.

* cited by examiner

*Primary Examiner* — James E McDonough
(74) *Attorney, Agent, or Firm* — FULLER IP LAW LLC; Rodney J. Fuller

(57) ABSTRACT

A selective metamaterial absorber and method for fabricating the same is disclosed. The method includes deposing a first metal layer on a first surface of a substrate and on a plurality of nanowires extending outward from the first surface of the substrate, the plurality of nanowires forming an array on the first surface, the substrate further including a second surface opposite the first surface. The first metal layer may be deposed using conformally sputtering. The substrate and the plurality of nanowires may be composed of silicon, and the first metal layer may be composed of tungsten. The first metal layer may be composed of a material having a penetration depth for a wavelength range of interest. The first metal layer may be at least three times thicker than the penetration depth.

8 Claims, 17 Drawing Sheets

(51) Int. Cl.
*B82Y 30/00* (2011.01)
*B82Y 40/00* (2011.01)

SELECTIVE METAMATERIAL ABSORBER AND METHOD FOR FABRICATING THE SAME

RELATED APPLICATIONS

This application claims the benefit of U.S. provisional patent application 63/244,693, filed Sep. 15, 2021 titled "Silicon-Cored Tungsten Nanowire Selective Metamaterial Absorbers for Enhanced Solar Thermal Energy Conversion," the entirety of the disclosure of which is hereby incorporated by this reference.

STATEMENT REGARDING FEDERALLY SPONSORED RESEARCH

This invention was made with government support under FA9550-17-1-0080 awarded by the Air Force Office of Scientific Research (AFOSR). The government has certain rights in the invention.

TECHNICAL FIELD

Aspects of this document relate generally to selective metamaterial solar absorbers.

BACKGROUND

Within the last decade, nanostructured metamaterials have become an attractive topic in the field of radiative heat transfer for thermal energy harvesting and radiative cooling. Spectrally selective absorbers with high solar absorption and low infrared emission are desired for efficient energy conversion when harvesting solar energy to heat. A number of metamaterial selective solar absorbers have been designed and demonstrated. However, due to their submicron feature sizes, advanced fabrication techniques such as electron-beam lithography and focused-ion beam are typically needed for fabricating these metamaterial structures. These techniques increase expense while also lowering throughput, prohibiting their use in large-area applications. Simpler and more cost-effective methods are needed for large-area manufacturing of selective metamaterial solar absorbers.

SUMMARY

According to one aspect, a method for fabricating a selective metamaterial absorber includes deposing, using conformal sputtering, a first metal layer on a first surface of a substrate and a plurality of nanowires extending outward from the first surface of the substrate. The plurality of nanowires forms an array on the first surface. The substrate further includes a second surface opposite the first surface. The substrate and the plurality of nanowires are composed of silicon. The first metal layer is composed of tungsten.

Particular embodiments may comprise one or more of the following features. The method may include forming the plurality of nanowires on the first surface of the substrate using photolithography. The method may also include deposing a second metal layer on the second surface of the substrate. The second metal layer may be at least 200-nm thick. The first metal layer may be at least three times thicker than a penetration depth for tungsten, for a wavelength range of interest. Each nanowire of the plurality of nanowires may have a diameter. The array of nanowires may have a period, and the diameter may be substantially equal to half the period.

According to another aspect of the disclosure, a method for fabricating a selective metamaterial absorber includes deposing a first metal layer on a first surface of a substrate and a plurality of nanowires extending outward from the first surface of the substrate, the plurality of nanowires forming an array on the first surface. The substrate further includes a second surface opposite the first surface.

Particular embodiments may comprise one or more of the following features. The first metal layer may be deposed onto the array of nanowires and the first surface of the substrate conformally. Deposing the first metal layer may include conformally sputtering the first metal layer onto the array of nanowires and the first surface of the substrate. The method may also include forming the plurality of nanowires on the first surface of the substrate using photolithography. The substrate and the plurality of nanowires may be composed of silicon. The first metal layer may be composed of tungsten. The method may also include deposing a second metal layer on the second surface of the substrate, and the second metal layer may be at least 200-nm thick. The first metal layer may be composed of a material having a penetration depth for a wavelength range of interest, and the first metal layer may be at least three times thicker than the penetration depth. Each nanowire of the plurality of nanowires may have a diameter, the array of nanowires may have a period, and the diameter may be substantially equal to half the period.

According to yet another aspect of the disclosure, a selective metamaterial absorber includes a substrate having a first surface and a second surface opposite the first surface. The selective metamaterial absorber also includes a plurality of nanowires extending outward from the first surface of the substrate, forming an array on the first surface, as well as a first metal layer conformally deposed on the first surface and the plurality of nanowires.

Particular embodiments may comprise one or more of the following features. The substrate and the plurality of nanowires may be composed of silicon. The first metal layer may be composed of tungsten. The absorber may also include a second metal layer on the second surface of the substrate, and the second metal layer may be at least 200-nm thick. The first metal layer may be composed of a material having a penetration depth for a wavelength range of interest, and the first metal layer may be at least three times thicker than the penetration depth. Each nanowire of the plurality of nanowires may have a diameter, the array of nanowires may have a period, and the diameter may be substantially equal to half the period.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
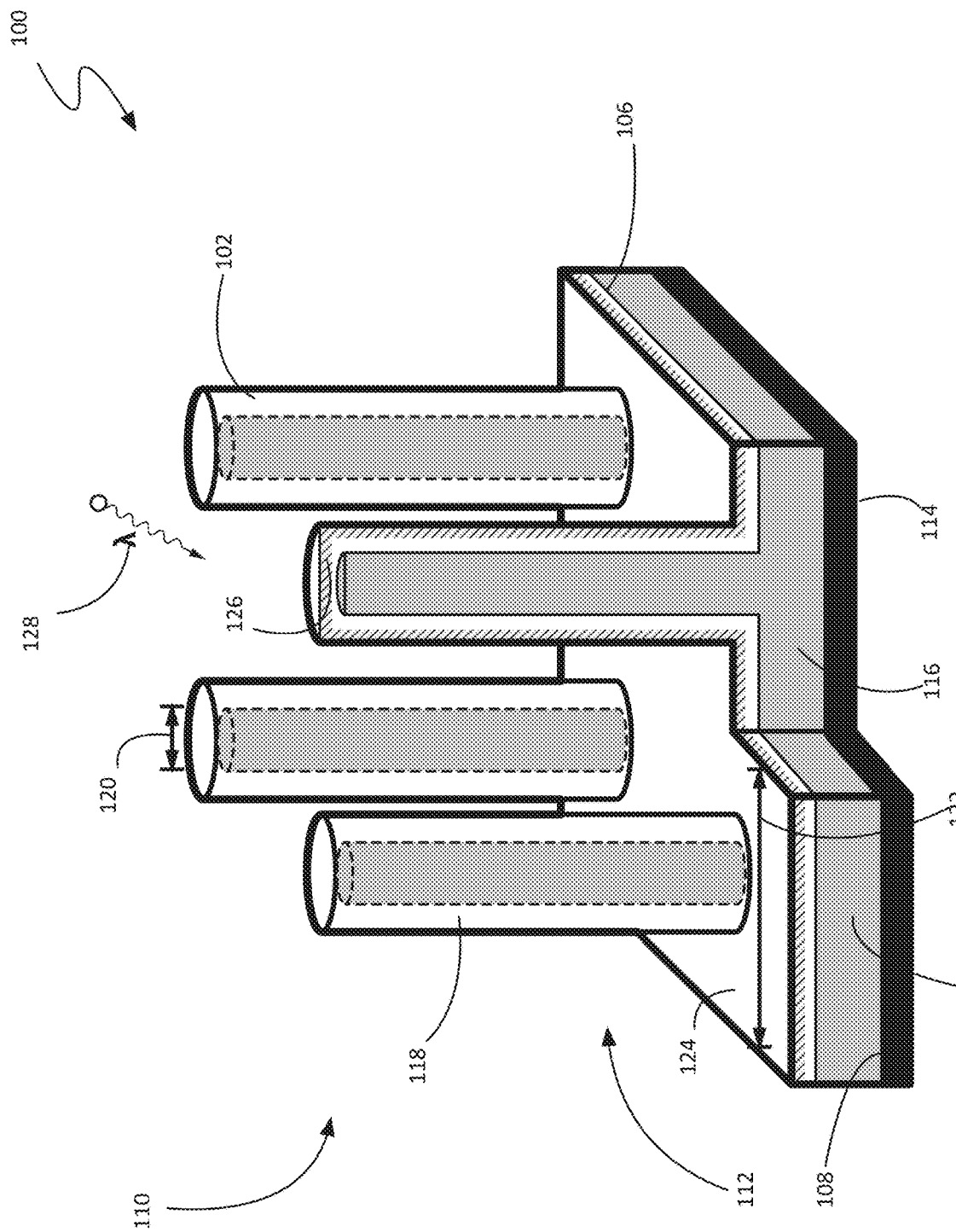
FIG. 1 is a perspective view of a selective metamaterial absorber with cut-away.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Contemplated herein is a nanowire-based selective metamaterial absorber for enhancing solar thermal energy conversion. These coated nanowire metamaterials have high solar absorbance combined with high infrared reflectance, helping to prevent thermal infrared emission from escaping, increasing conversion efficiency. Advantageous over other endeavors to develop nanostructured metamaterials to serve as selective absorbers, the contemplated selective metamaterial absorbers (hereinafter "selective metamaterial" or SMA) are easy to fabricate using readily available materials and known techniques applied to create novel materials with desirable properties. As will be discussed in greater detail below, according to various embodiments, the contemplated metamaterial is fabricated by forming nanowires on a substrate, followed by the deposition of a coating on the nanowires and substrate.

FIG. 1 is a perspective view of a non-limiting example of a selective metamaterial absorber 100, with a cut-away showing a cross-section of a nanowire 110. As shown, the SMA 100 comprises a substrate 104 with a plurality of nanowires 110 extending outward from the substrate 104. The nanowires 110 and the surface of the substrate 104 they extend from are covered in a thin coating, the first metal layer 102. In some embodiments, the other side of the substrate 104 may have a second layer 114 of metal.

The substrate 104 has a first surface 106 and a second surface 108 that is opposite the first surface 106. As shown, the nanowires 110 extend outward from the first surface 106. The substrate 104 may be composed of various materials. In some embodiments, the substrate 104 may be composed of silicon 116. The use of silicon 116 is advantageous, as the technologies for manufacturing nanoscale structures (e.g., nanowires) using a single crystal silicon substrate are mature. In other embodiments, the substrate 104 may be composed of other materials that may be more appropriate for a specific application.

The nanowires 110 extend outward from the first surface 106. According to various embodiments, the plurality of nanowires 110 are arranged on the first surface 106 in an array 112. In some embodiments, the nanowires 110 may be created on the substrate 104 as part of the SMA 100 fabrication process. In other embodiments, a commercially prepared substrate 104 with an array 112 of nanowires 110 may be used. As a specific example, in one embodiment, a commercially available 2D silicon nanowire stamp (i.e., nanostamp from LightSmyth Technologies, S2D-18B2-0808-350-P, having 1-10 Ω·cm resistivity, single-side polished, 8×8 mm2, 675 μm thickness) may be used.

According to various embodiments, the first metal layer 102 is conformally deposed on at least the first surface 106 as well as all exposed surfaces of the nanowires 110, such that a layer of even thickness is formed and the shape of the nanowires 110 (e.g., cylindrical, etc.) is preserved. Fabrication methods will be discussed in greater detail with respect to FIG. 2, below.

According to various embodiments, the first metal layer 102 may be composed of a material 124 well suited for the intended application and use environment. For example, in some embodiments, the material may be a refractory material able to withstand high operating temperatures. Furthermore, the material 124 is chosen to achieve the desired absorptance spectrum. For example, in some embodiments, the first metal layer 102 may be composed of tungsten 118.

Both silicon 116 and tungsten 118 have similar total solar absorptance, but tungsten 118 further has high thermal stability and high reflectance in the infrared region. In some embodiments, tungsten 118 is selected to be the coating material because of its excellent high-temperature stability in vacuum, its high absorption in the visible and near-infrared, and very low emission in the mid-infrared regime. It should be noted that while much of this disclosure focuses on silicon-cored tungsten nanowire metamaterials, other embodiments may make use of different nanowire cores and/or coatings. For example, other embodiments may make use of various materials for the nanowire core. However, silicon is advantageous, as the technology for manufacturing silicon nanowires or nanostamps is well-established and less expensive than other materials. The focus on silicon-cored tungsten embodiments should not be construed as limiting, as the methods and structures contemplated herein may be applied to other materials having properties advantageous for specific applications.

In some embodiments, the SMA 100 may also comprise a second metal layer 114 deposed on the second surface 108 of the substrate 104. This layer 114 serves to make the SMA 100 opaque, minimizing losses. As a specific example, in one embodiment, the second metal layer 114 may be composed of aluminum, and may be at least 200-nm thick. Those skilled in the art will recognize that other materials, including non-metals, may be used for similar purposes.

It should be noted that FIG. 1 is not drawn to scale. Instead, the scale was chosen to clearly depict the various elements of the SMA 100, according to various embodiments. The nanowire array 112 itself is on the nanometer-scale. In some embodiments, the diameter 120 of the nanowires 110 may be substantially equal to half the size of the period 122 of the array 112. In the context of the present description and the claims that follow, "substantially equal" means within 5%. For example, in a specific embodiment, nanowires 110 may have a diameter of 275 nm and a height of 350 nm, and the array 112 may have a period 122 of 600 nm. Other embodiments may make use of geometries and distances substantially equal to these values (i.e., within 5%). It should be noted that changing the geometry will change the spectral absorptance of the SMA 100. These geometric parameters may be varied to tune the SMA 100 to achieve better performance under different conditions, an advantage over conventional solutions.

The first metal layer 102 is a very thin coating. In some embodiments, the thickness of this first metal layer 102 may be at least three times thicker than the penetration depth 126 of the first metal layer 102 material (e.g., tungsten 118) within the wavelength range of interest 128 (e.g., the range of wavelengths the SMA 100 is intended to best absorb). In the context of the present description and the claims that follow, the penetration depth 126 is a measure of how deep electromagnetic radiation can penetrate into a material, and is defined as the depth at which the intensity of the radiation inside the material falls to 1/e of its original value at the surface.

Figure 2:
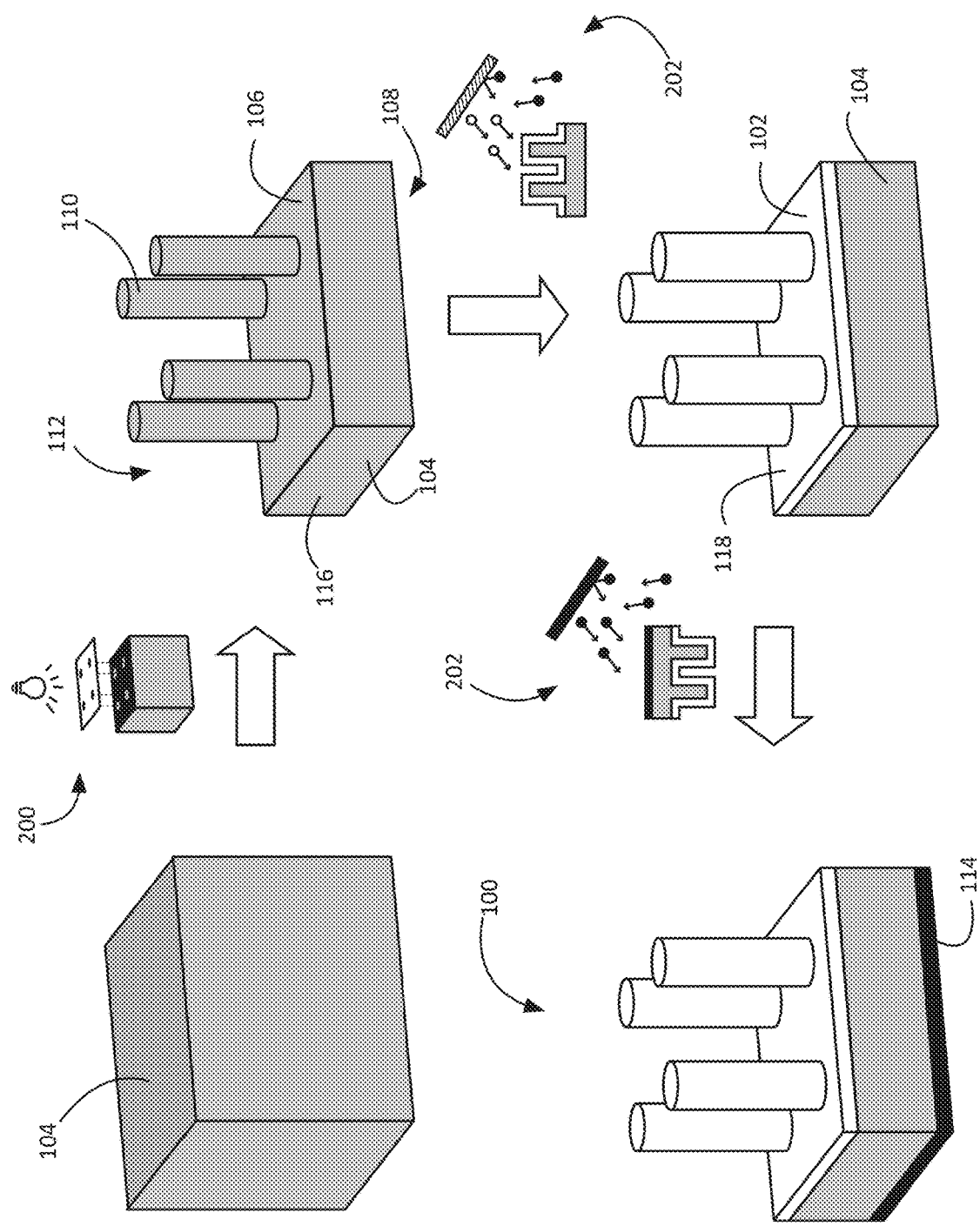
FIG. 2 is a process flow of a method for fabrication of a selective metamaterial absorber.

FIG. 2 is a process flow of a non-limiting example of a method for fabrication of a selective metamaterial absorber. As shown, in some embodiments, the process begins with the fabrication of the nanowires 110 on the first surface 106 of the substrate 104. There are various methods for creating nanoscale structures using various substrate 104 materials. As a specific example, in some embodiments, the nanowires 110 may be fabricated using photolithography 200. Of course, in some embodiments, the contemplated fabrication method may be applied to off-the-shelf nanostructured substrate 104 (e.g., nano-stamped Si wires, etc.), further simplifying the process.

Next, the first metal layer 102 is deposed on the array 112 of nanowires 110 and the first surface 106 of the substrate 104 from which they extend. According to various embodiments, this deposition is conformal, resulting in a coating of even thickness on the nanowires 110 and first surface 106. Those skilled in the art will recognize that there are numerous methods for the conformal deposition of a material 124 on a surface. In some embodiments, the first metal layer 102 may be deposed using conformal sputtering 202, resulting in a continuous layer uniformly deposited on the top and side surfaces of the nanowires 110, preserving their original nanowire shape. As a specific, non-limiting example, in one embodiment a thin tungsten layer 102 is conformally sputtered (e.g., using a Lesker PVD75) onto a silicon substrate 104 and nanowires 110 at a deposition rate of 1 Å/s.

As an option, in some embodiments, a second metal layer 114 may be deposed on the second surface 108 of the substrate 104. As a specific example, in one embodiments a 200-nm-thick aluminum layer may be sputtered onto the second surface 108 of the substrate 104 at 1 Å/s, to ensure opacity. In the discussion below, embodiments with a second metal layer 114 may be referred to as backed SMA 100 or SMA+Al 100.

The following discussion of FIGS. 3A-6C explores properties and the performance of the specific embodiment discussed above, where tungsten 118 has been conformally sputtered onto an array 112 of silicon nanowires 110 on a silicon substrate 104. In some cases, an embodiment also having a 200-nm-thick aluminum layer (i.e., the second metal layer 114) on the back will also be discussed. In this specific example, the tungsten 118 coating is uniform and roughly 45 nm (i.e., within 5%). The height of the nanowires 110 is roughly 350 nm, and the diameter is roughly 275 nm. The height of the coated nanowires is the same as the core nanowires (i.e., 350 nm), since tungsten layer on the top of the nanowires and the layer on top of the surface of the silicon substrate is the same, roughly 45 nm (i.e., within 5%). This will hereinafter be referred to as the specific embodiment. However, it is important to remember that this is a specific, non-limiting example and should not be construed as a limitation.

Figure 3A:
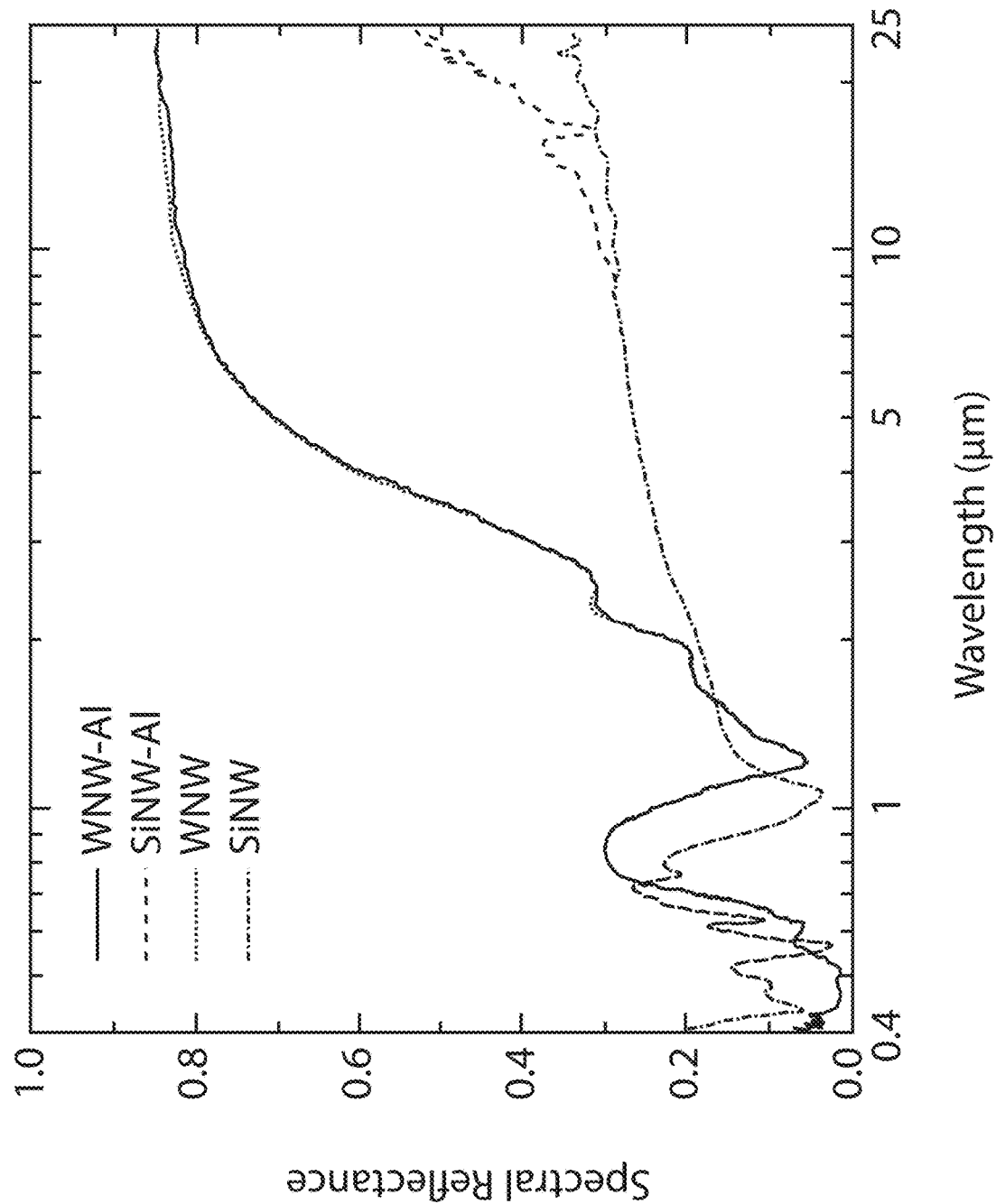
FIGS. 3A-3D are plots of measured spectral reflectance, absorptance, and total emittance for embodiments of the selective metamaterial absorbers.
Figure 3B:
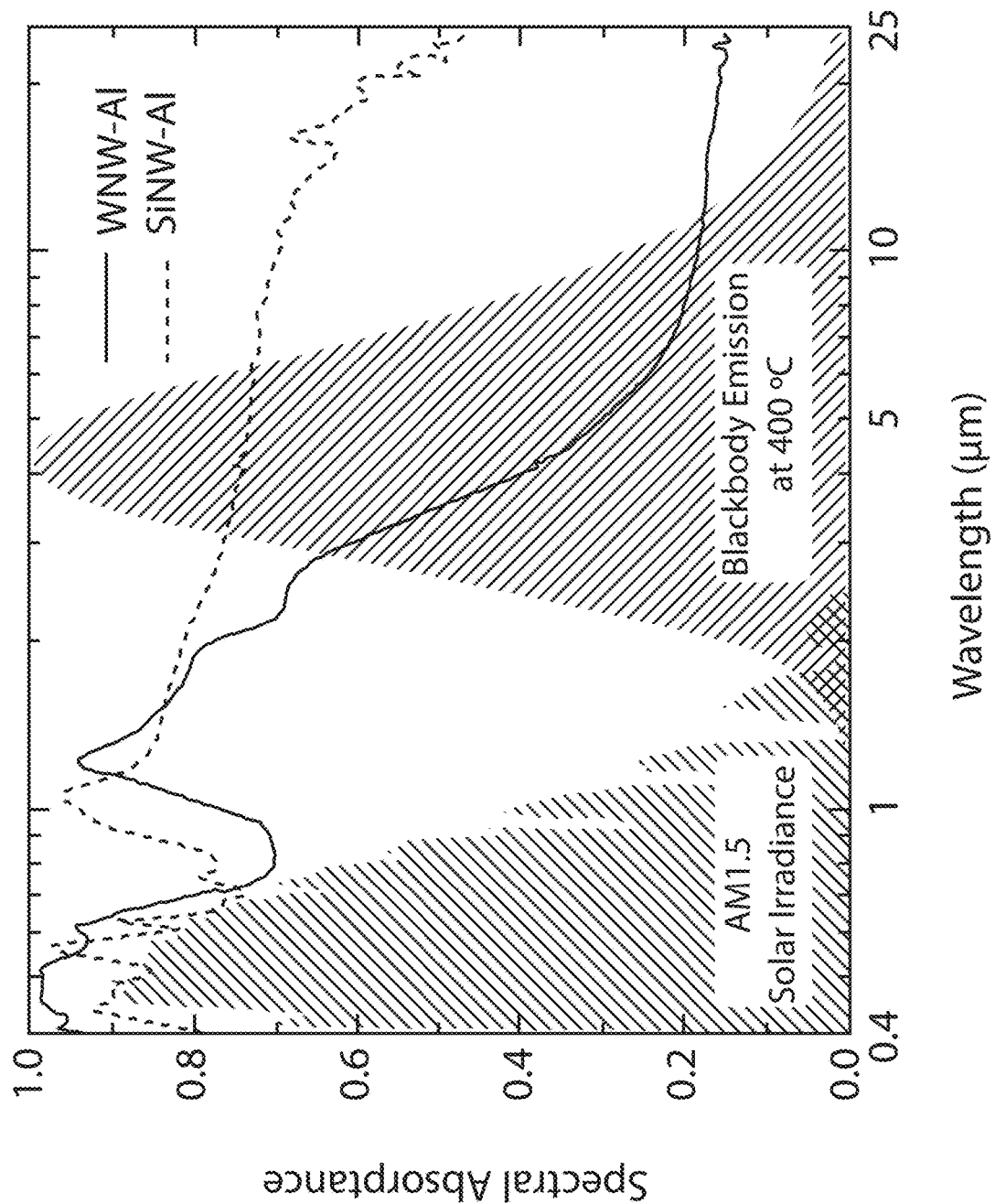
Figure 3C:
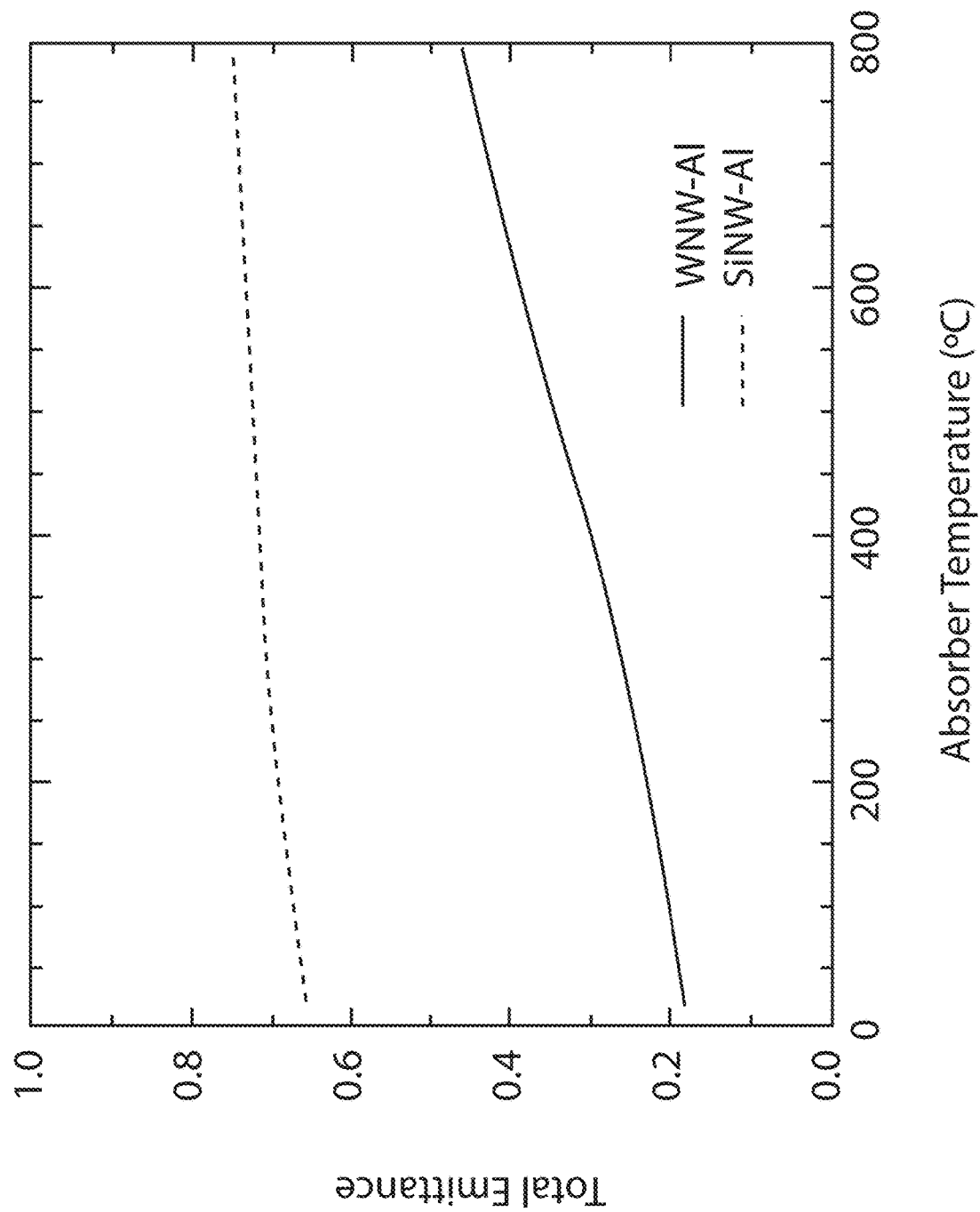
Figure 3D:
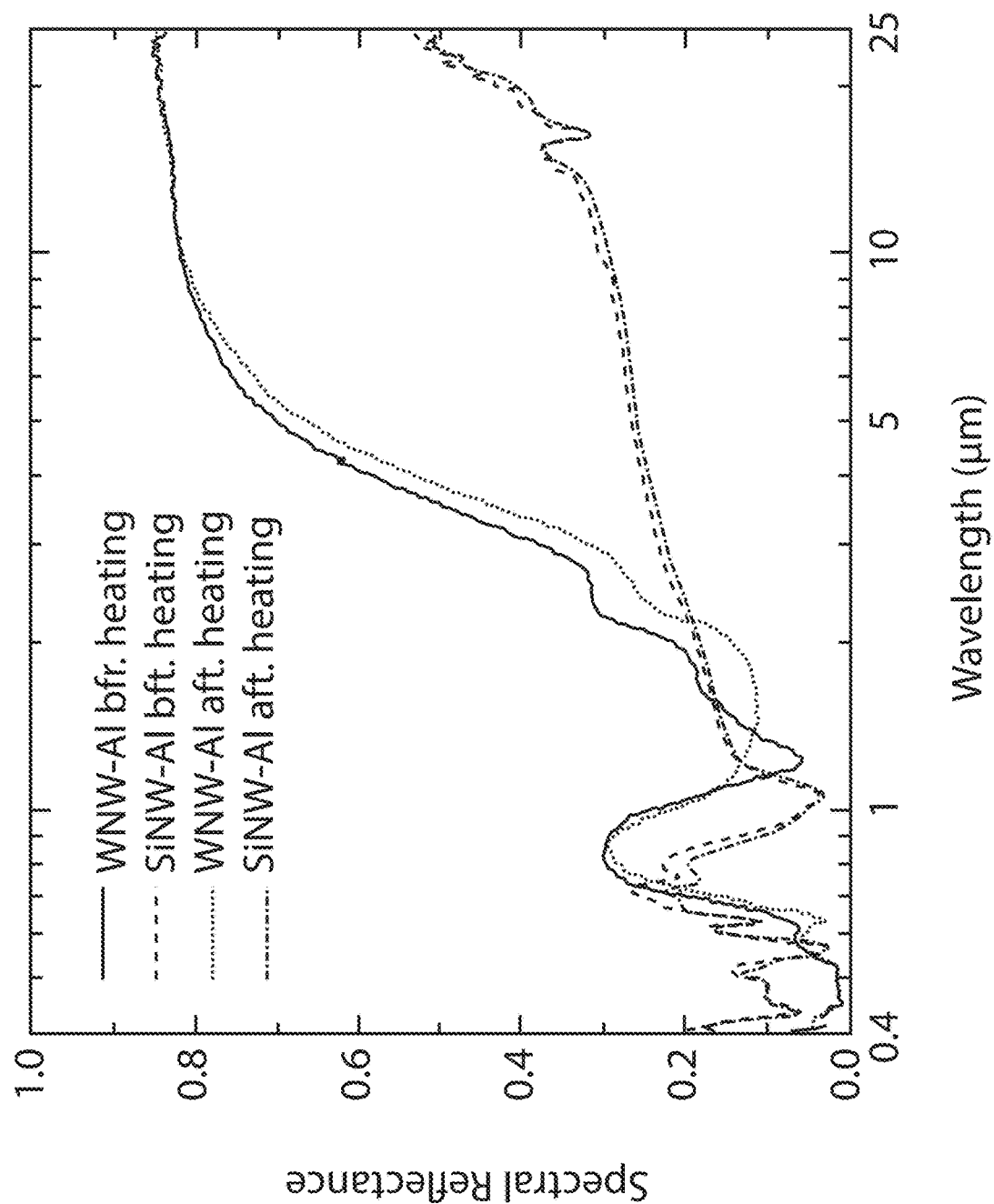

FIGS. 3A-3D are plots of measured spectral reflectance, absorptance, and total emittance for non-limiting examples of the selective metamaterial absorbers. Specifically, FIG. 3A shows the measured spectral (near-normal) reflectance ($R_\lambda$) in the broad spectral range from 0.4 to 25 µm for bare silicon nanowire 110 (SiNW) and the specific embodiment of the SMA 100 before and after the deposition of 200-nm-thick Al on the second surface 108. FIG. 3B shows the spectral absorptance (or spectral emittance $\varepsilon_\lambda = \alpha_\lambda$ according to Kirchhoff's law) obtained from measured spectral reflectance (i.e., $\alpha_\lambda = 1 - R_\lambda$) in the broad spectral range from visible to mid-infrared for opaque SMA 100 and the specific embodiment of the SMA 100 with Al backside coating (SMA+AL). FIG. 3C shows the calculated total emittance of SiNW and the same specific embodiment of SMA+Al, as a function of absorber temperature. FIG. 3D shows the measured spectral reflectance of SiNW-AL and the same embodiment of SMA+Al samples in the broad spectral range at room temperature before and after solar-thermal heating tests in vacuum with a maximum temperature of 375° C. for 10 h.

FIG. 3A shows the measured spectral (near-normal) reflectance ($R_\lambda$) of the SiNW and a specific, non-limiting embodiment of the contemplated silicon-cored WNW metamaterial in the broad wavelength range 0.4-25 µm. Within the visible and near-infrared, both SiNW and WNW samples exhibit comparable low reflectance with a peak value around 0.30. However, the reflectance of the WNW sample increases abruptly at wavelengths beyond 2 µm, reaching $R_\lambda = 0.75$ around $\lambda = 5$ µm, whereas at $\lambda = 5$ µm the bare SiNW sample has a reflectance of 0.30. It should be noted that for a selective solar absorber, the infrared reflectance should be as high as possible to minimize thermal emission losses. The significantly higher infrared reflectance of the contemplated SMA 100 indicates potentially better solar-thermal conversion than the bare SiNW, due to the highly reflective tungsten 118 coating in the infrared.

According to various embodiments, applications of the contemplated solar absorber may comprise a conduit of heat transfer fluids in thermal contact with the back surface of the contemplated metamaterial. The solar absorber may be opaque in some embodiments, such that the thermal emission from the hot heat transfer fluids underneath will not penetrate to lose heat. Spectral (normal) transmittance measurements reveal that the bare SiNW sample still has up to 15% transmission, from 1 µm to 3.5 µm, in the near-infrared because of the low silicon doping, whereas the specific embodiment of SMA 100 along with the 40-nm-thick bare tungsten film deposited on lightly doped silicon wafer show only about 2% transmission in the same wavelengths. Due to the bandgap absorption and large thickness of silicon wafer, the transmission at wavelengths 1<1 µm for both SMA 100 and SiNW samples is effectively zero.

In some embodiments, a 200-nm-thickness Al film is sputtered at a rate of 1 Å/s onto the back surfaces of the substrates 104, to ensure complete opaqueness, which was confirmed by the zero transmittance from the measurement. The broadband reflectance measurement further demonstrates the effectiveness of the Al backside coating, in particular for bare SiNW, whose infrared reflectance was increased from 0.35 to 0.55 at the wavelength $\lambda = 25$ µm. In contrast, the measured spectral reflectance of the specific embodiment of SMA 100 barely changes after Al backside coating (i.e., second metal layer 114) within the entire spectrum of interest and remains as high as 0.85 in the infrared.

With the aluminum backside coating, it is reasonable to calculate the spectral absorptance simply by $\alpha_\lambda = 1 - R\alpha$ and the spectral emittance $\varepsilon_\lambda = \alpha_\lambda$ according to Kirchhoff's law. Note that in principle the spectral reflectance should be hemispherical when calculating the absorptance from the energy balance. However, for periodic structures under normal incidence, only specular reflection occurs at wavelengths longer than its period, with higher diffraction orders evanescent according to the Bloch-Floquet equation for gratings. Therefore, the measured spectral specular reflectance can be directly used for calculating the spectral normal absorptance for the spectrum with wavelengths $\lambda > 0.6$ µm for both the SiNW—Al and the specific embodiment of SMA+Al absorbers, whereas it is approximated as the hemispherical reflectance for simplicity here at the shorter spectrum 0.4 µm<$\lambda$<0.6 µm.

FIG. 3B plots the spectral (normal) absorptance aa (or emittance $\varepsilon_\lambda$) for both SiNW—Al and the specific embodiment of SMA+Al absorbers, calculated from the spectral reflectance measurements for wavelengths from 0.4 to 25 µm. The spectral solar irradiance $G_{\lambda,AM1.5}$ from air mass 1.5 Global tilt and spectral blackbody emissive power $E_{b,\lambda}(T)$ at T=400° C., both normalized to the peak spectral emissive power of 0.178 W/cm²/µm, are also shown.

As shown, the specific embodiment of the contemplated SMA+Al metamaterial has absorption higher than 70% within the entire solar spectrum thanks to several absorption peaks observed at $\lambda = 2.44$ µm, 1.89 µm, 1.28 µm, and 0.60 µm, whereas its emittance is as low as 0.15 in the infrared, suggesting strong solar absorption and excellent suppression of infrared thermal emission. On the other hand, the SiNW—Al sample has comparably high absorptance in the solar spectrum with major peaks at $\lambda = 1.1$ µm and 0.60 µm, but its infrared spectral emittance is greater than 0.6 at wavelengths $\lambda < 10$ µm and is still as high as 0.45 at $\lambda = 25$ µm, indicating higher thermal emission loss than the specific embodiment of SMA 100.

It should be noted that the minor absorption peak for SiNW—Al around $\lambda = 15$ µm is due to intrinsic optical phonon absorption of silicon. The 40-nm tungsten front coating significantly reduced the spectral emittance of the bare SiNW by as much as 0.52 in the wavelength range 3 µm<$\lambda$<10 µm, where most of the blackbody emission spectrum at 400° C. is located, and therefore excellent spectral selectivity is experimentally demonstrated with this specific embodiment of the contemplated SMA 100.

As shown in FIG. 3C, the total emittance change from room temperature 20° C. to 400° C. is only 0.18 to 0.30 for a specific embodiment of the contemplated SMA+Al absorber but 0.66 to 0.72 for the SiNW—Al absorber. This indicates a significant reduction of 0.42 in total emittance at 400° C. by coating 40-nm tungsten onto the commercial SiNW nanostamp to achieve spectral selectivity to suppress infrared emission loss while maintaining high solar absorption greater than 85%. As the absorber temperature keeps going up, the total emittance of the SMA+Al absorber increases slightly to 0.38 at 600° C. and 0.46 at 800° C., as the blackbody spectrum shifts toward shorter wavelengths and starts to overlap with the part of the solar spectrum where the spectral absorptance is higher. On the other hand, the total emittance of the SiNW—Al absorber saturates around 0.75 at higher temperatures, due to the lack of spectral selectivity.

Thermal stability is another major concern for selective solar-thermal absorbers operating at high temperatures. The spectral reflectance of both SMA+Al and SiNW—Al samples were measured after heating in a vacuum with a maximum temperature of 375° C. for 10 hours during solar-thermal tests. As shown in FIG. 3D, the measured spectral reflectance barely changes in the broad spectral range before and after the heating, whereas the SMA+Al absorber exhibited no more than an 8% decrease in reflectance (or increase of absorptance) within the infrared from 1.5 to 10 μm due to the possible oxidation of tungsten with residual oxygen atoms during the solar-thermal tests. This indicates the good thermal stability of both the contemplated SMA+Al and SiNW—Al metamaterials in vacuum at medium to high temperatures.

Figure 4A:
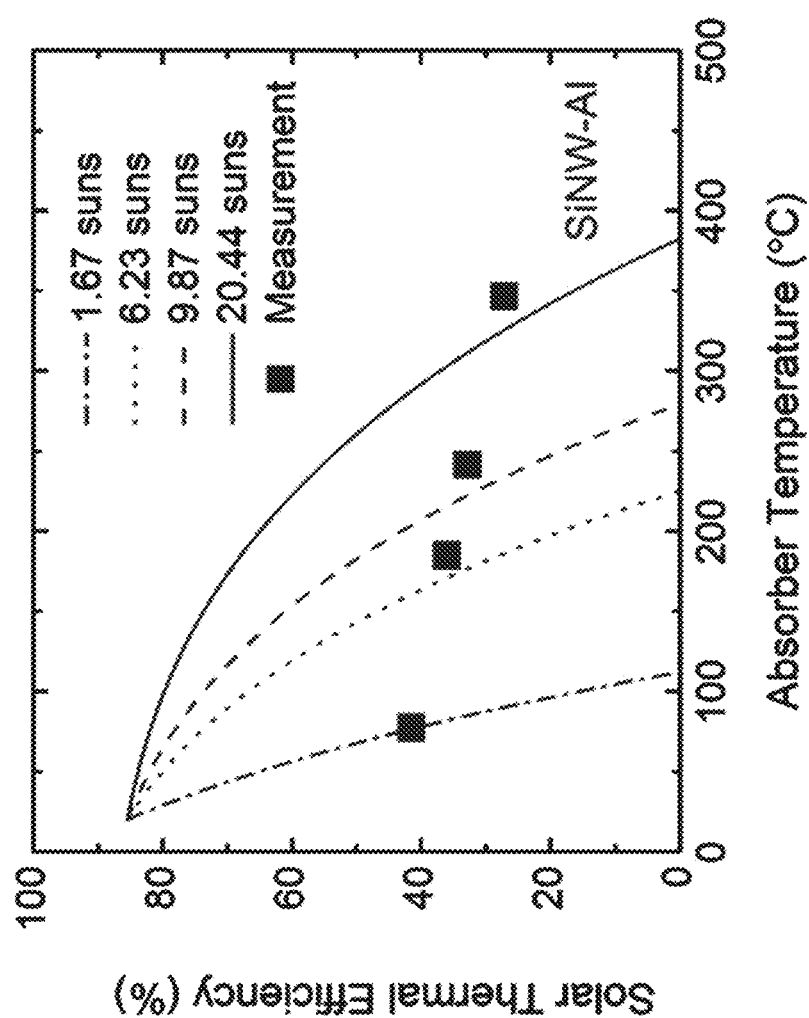
FIGS. 4A-4D show the results of solar-thermal testing performed on an embodiment of a selective metamaterial absorber.
Figure 4B:
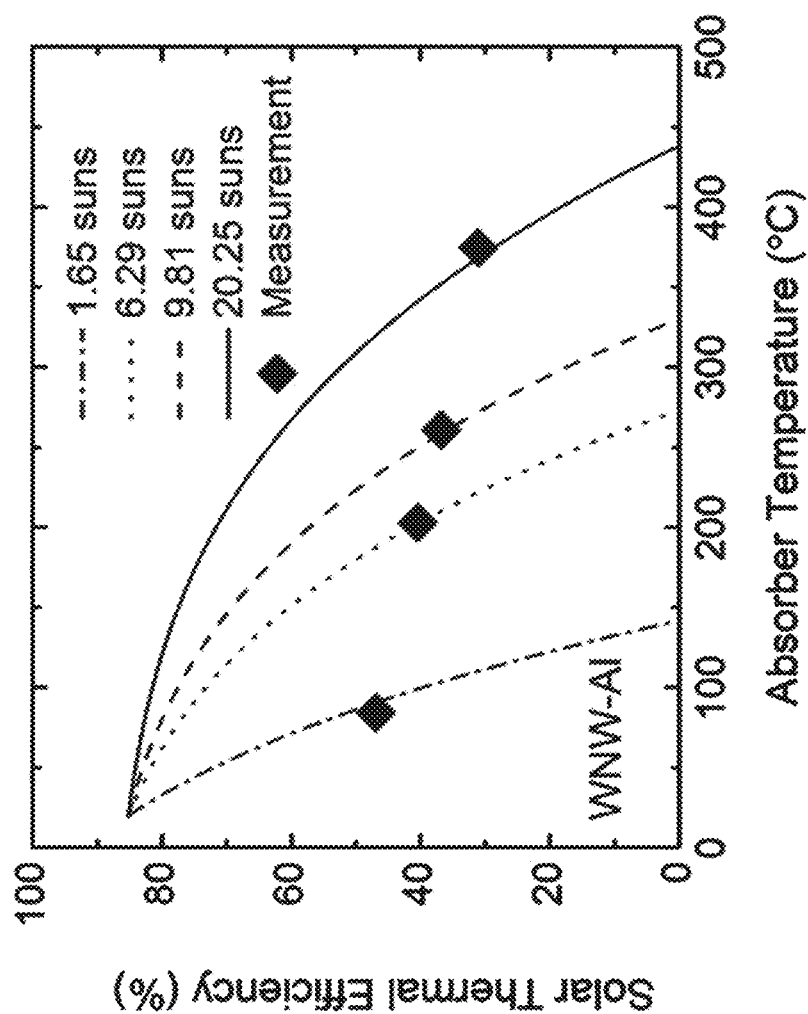
Figure 4C:
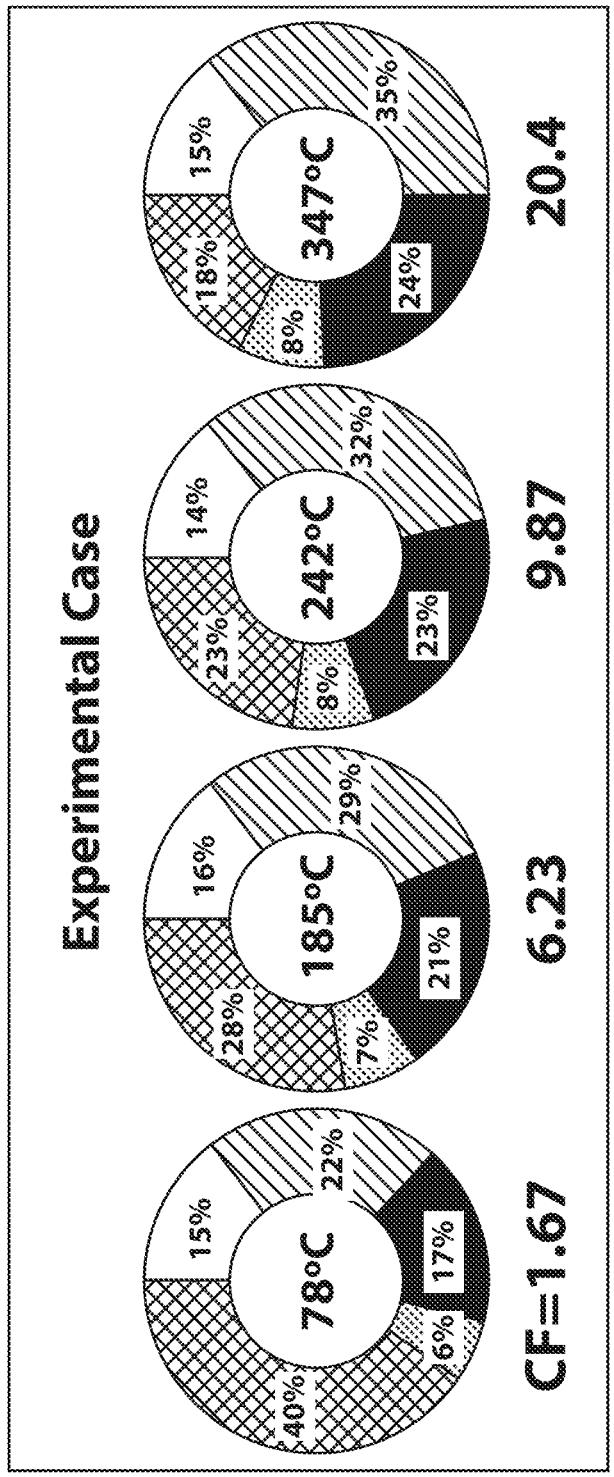
Figure 4D:
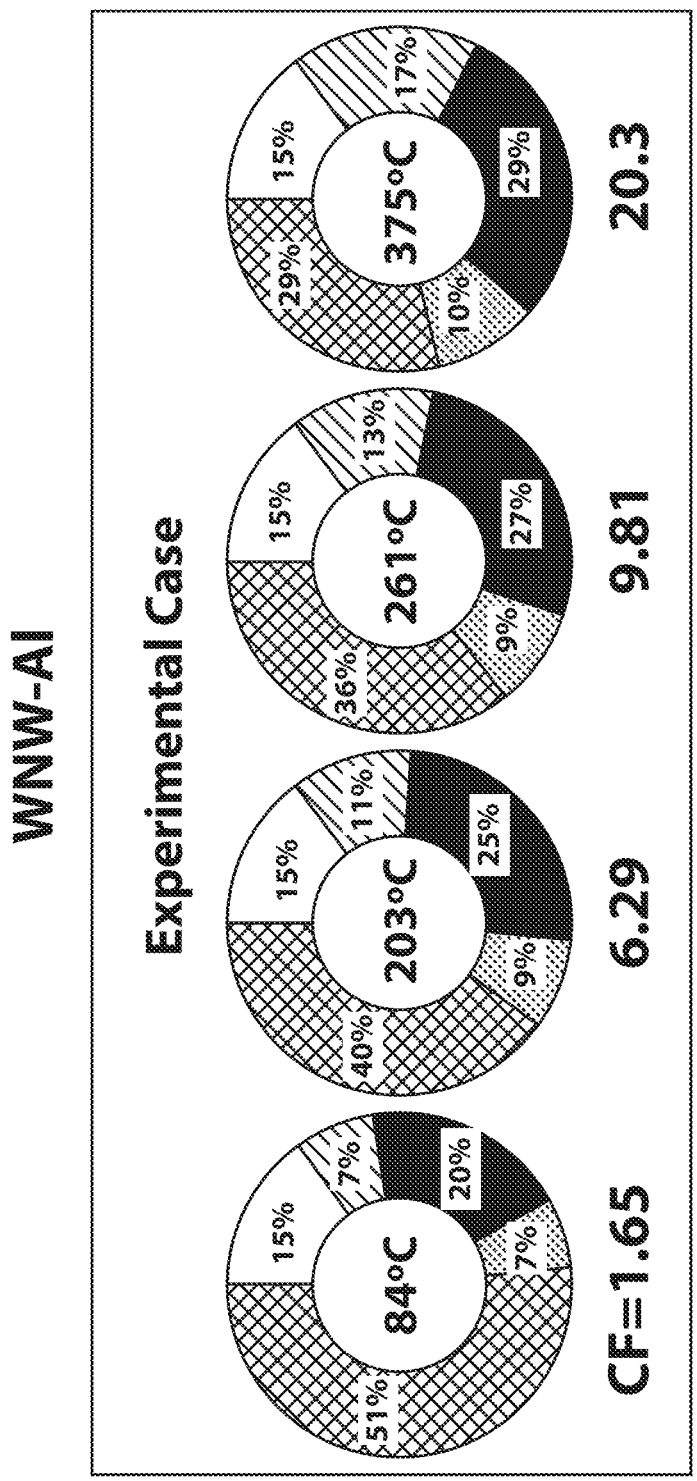

FIGS. 4A-4D show the results of solar-thermal testing performed on the specific embodiment of the contemplated SMA 100. Specifically, FIGS. 4A and 4B show the measured solar-thermal efficiency at multiple solar concentrations for fabricated SiNW—Al and SMA+Al absorbers, respectively. FIGS. 4C and 4D show heat transfer analysis pie charts of energy loss ratios for SiNW-AL and SMA+Al metamaterials (respectively) at measured absorber temperatures under corresponding solar concentration factors (CF).

FIGS. 4A and 4B present the measured solar-thermal efficiency under multiple solar concentrations from the solar-thermal tests for fabricated SiNW—Al and SMA+Al absorbers, respectively. The markers show measured efficiencies, while the lines show theoretical predictions. In particular, with parasitic radiative losses the SMA+Al absorber achieved experimental solar-thermal efficiencies of 47%, 41%, 37%, and 31% under 1.7, 6.3, 9.8, and 20 suns, which is about 5% (absolute value) higher than that of the SiNW—Al absorber under the same solar concentration. Considering almost the same solar absorptance, this solar-thermal efficiency enhancement directly observed from the solar-thermal test is due to the excellent spectral selectivity of the SMA+Al absorber with a much smaller total emittance that suppressed the thermal emission loss.

The calculated theoretical efficiencies agree well with the experimentally measured ones with less than 3% difference for both SiNW—Al and SMA+Al absorbers in this specific non-limiting embodiment, which validates the solar-thermal test result. In particular, the modeling also suggests that the SMA+Al absorber could reach the stagnation temperatures (i.e., the highest temperature with zero efficiency or no heat gain) of 142° C., 273° C., 330° C., and 438° C. under 1.67, 6.23, 9.87, and 20.44 suns, which is 30° C.-56° C. higher than those of SiNW—Al absorber.

As shown in FIGS. 4C and 4D, respectively, heat transfer analysis pie charts plot the ratios of each heat transfer mode to the incident solar irradiation for the SiNW—Al and SMA+Al samples at the measured absorber temperatures under different solar concentration factors (CF). Both nanowire absorbers reflect about the same 15% (white) of incident solar energy, whereas the SMA+Al absorber loses 7%-17% of total energy from its top surface (single line shading), compared with 22%-35% from the SiNW—Al absorber from 1.67 to 20.4 suns, thanks to the reduced thermal emittance with about 40-nm tungsten coating in this specific example. On the other hand, during the solar-thermal tests both samples suffer from the parasitic radiative losses from the side (dot shading) and bottom (black) surfaces, which account for 23%-39% of the energy losses.

The SMA 100 contemplated herein may be implemented in a range of solar thermal energy harvesting applications including, but not limited to, parabolic trough-type collectors. According to various embodiments, the radiative losses from the side or bottom surfaces of the contemplated metamaterials could be eliminated, as the SMA 100 can be coated on the inner surfaces of evacuated circular tubes, according to various embodiments.

Figure 5A:
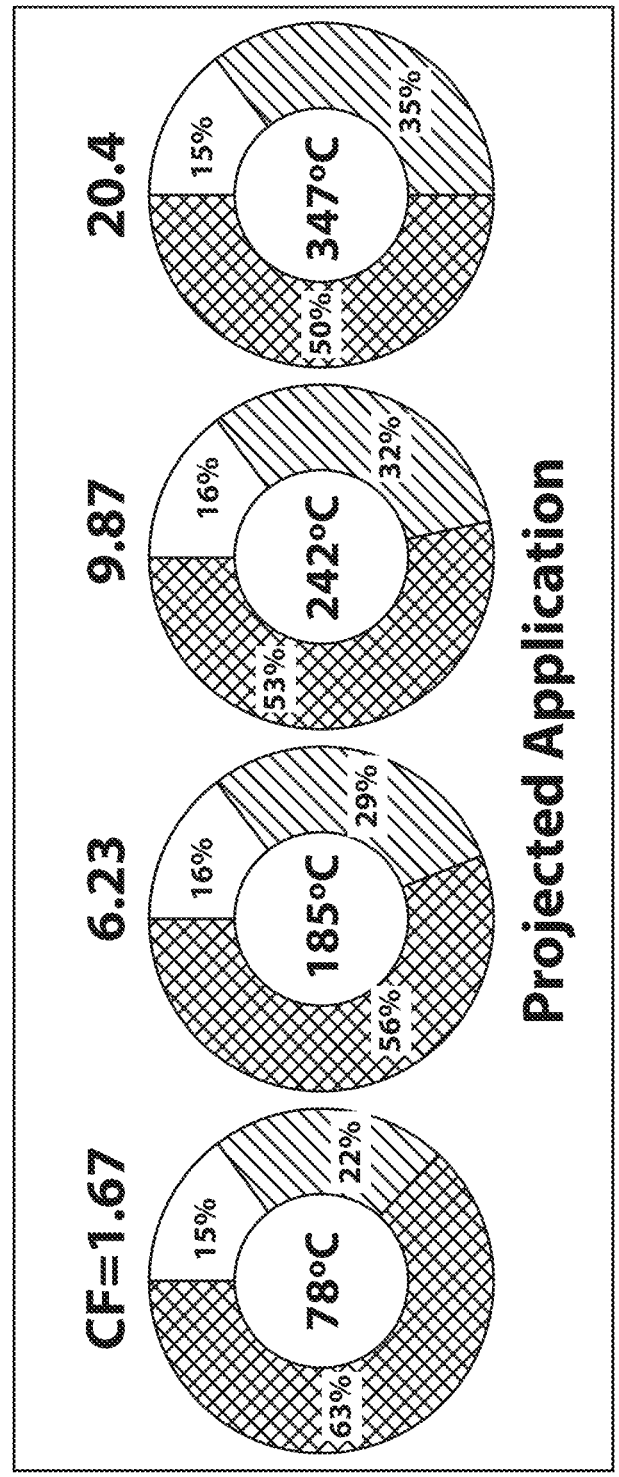
FIGS. 5A-5D show the results of theoretical solar-thermal testing performed on a selective metamaterial absorber, in the context of a potential application.
Figure 5B:
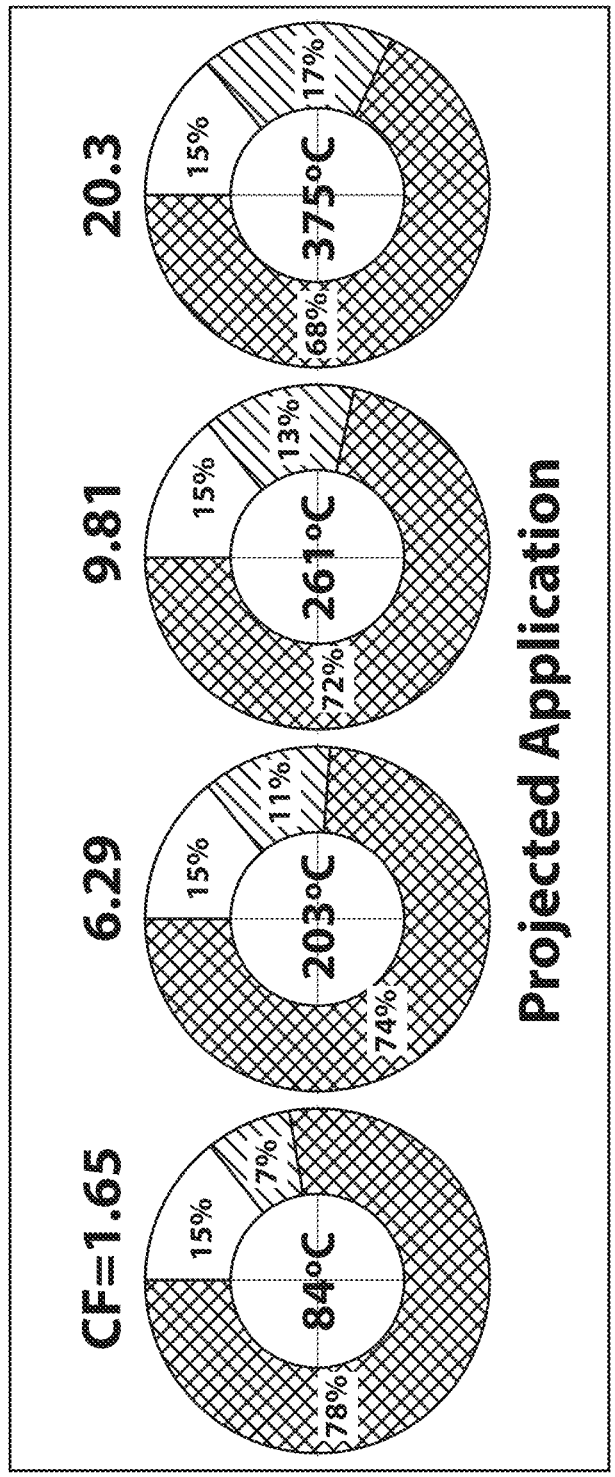
Figure 5C:
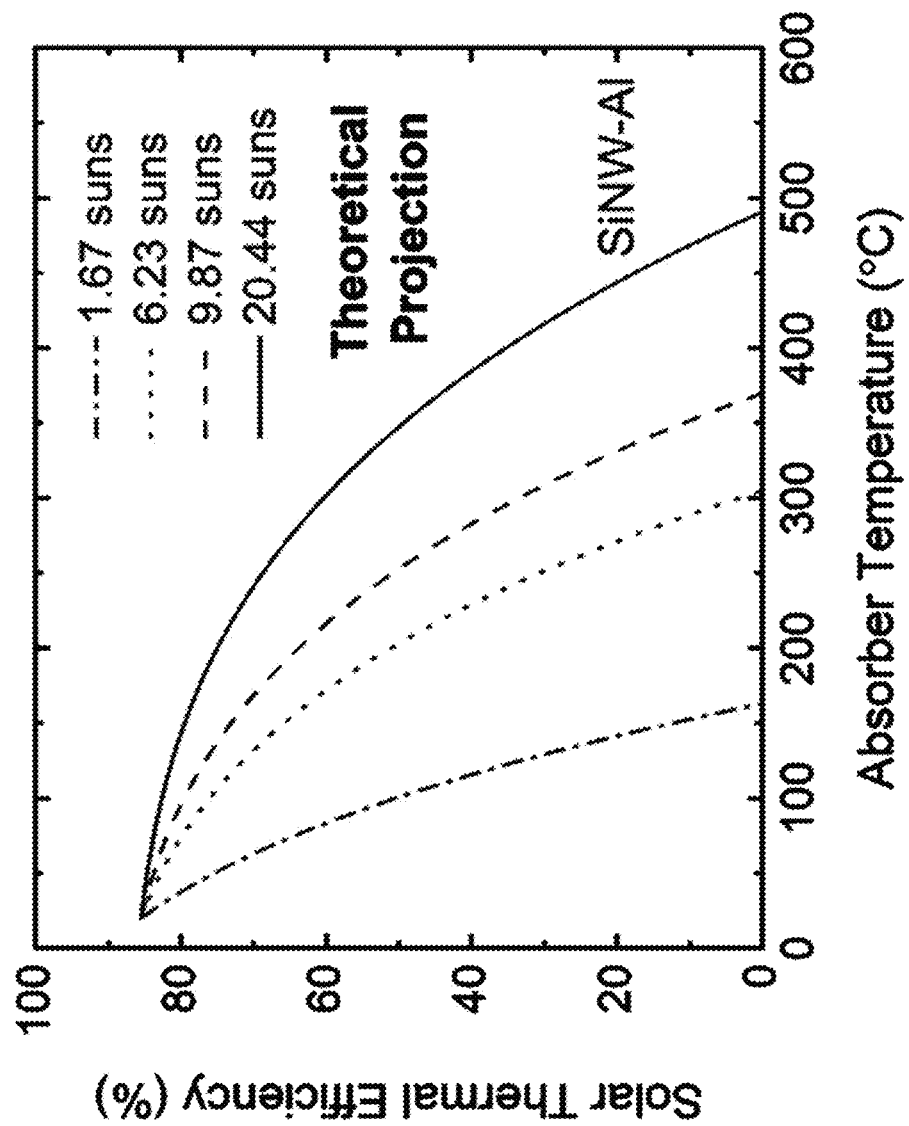
Figure 5D:
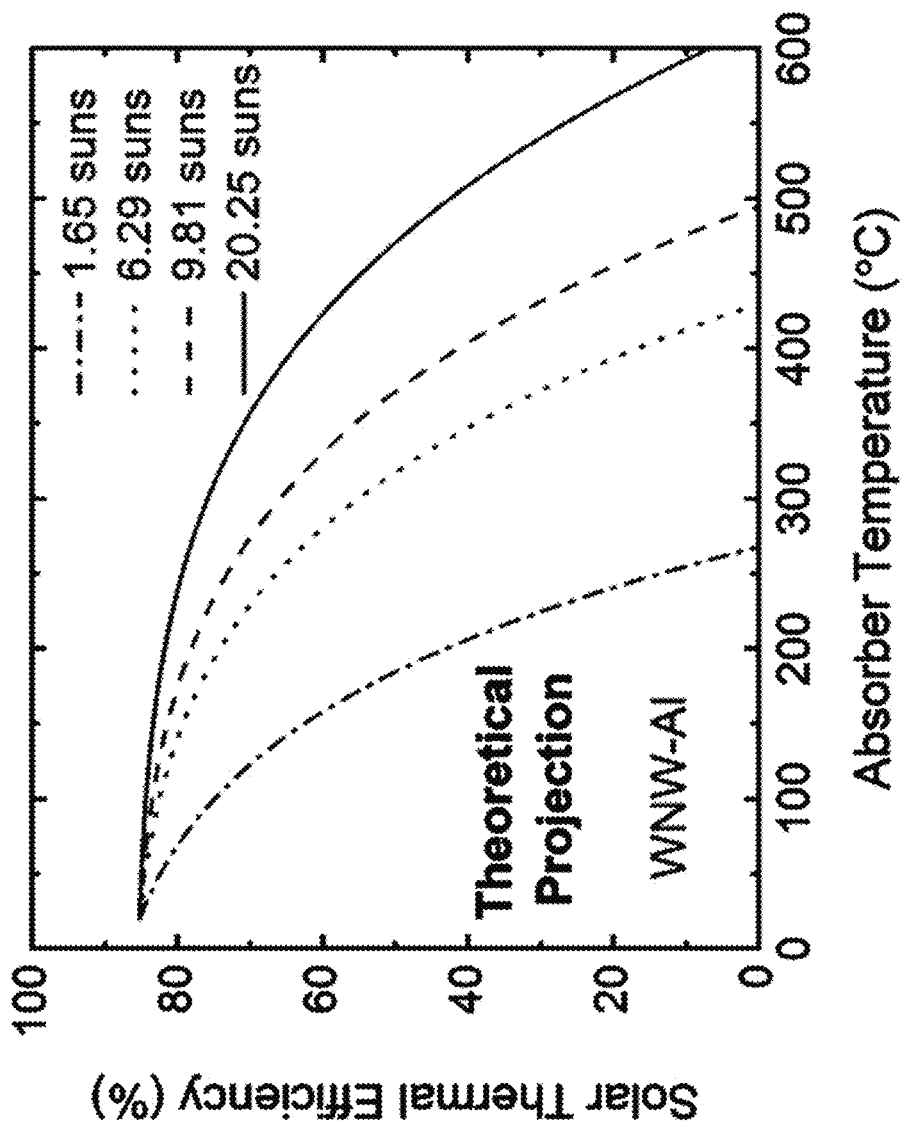

FIGS. 5A-5D show the theoretical results of solar-thermal testing performed on the same specific embodiment of the contemplated SMA 100, as well as SiNW—Al, in the context of a potential application. Specifically, FIGS. 5A and 5B show heat transfer analysis pie charts of energy loss ratios under corresponding solar concentration factors (CF) for some specific applications of SiNW—Al and SMA+Al, respectively. FIGS. 5C and 5D show the theoretically predicted solar-thermal efficiency at multiple solar concentrations for SiNW—Al and SMA+Al metamaterials as a function of absorber temperature for some specific solar-thermal applications. It should be noted that the specific, projected applications considered here are applications where the radiation losses from the side and bottom surfaces can be eliminated (e.g., coating the selective solar absorbers on the inner surfaces of evacuated circular tubes, etc.).

Figure 6A:
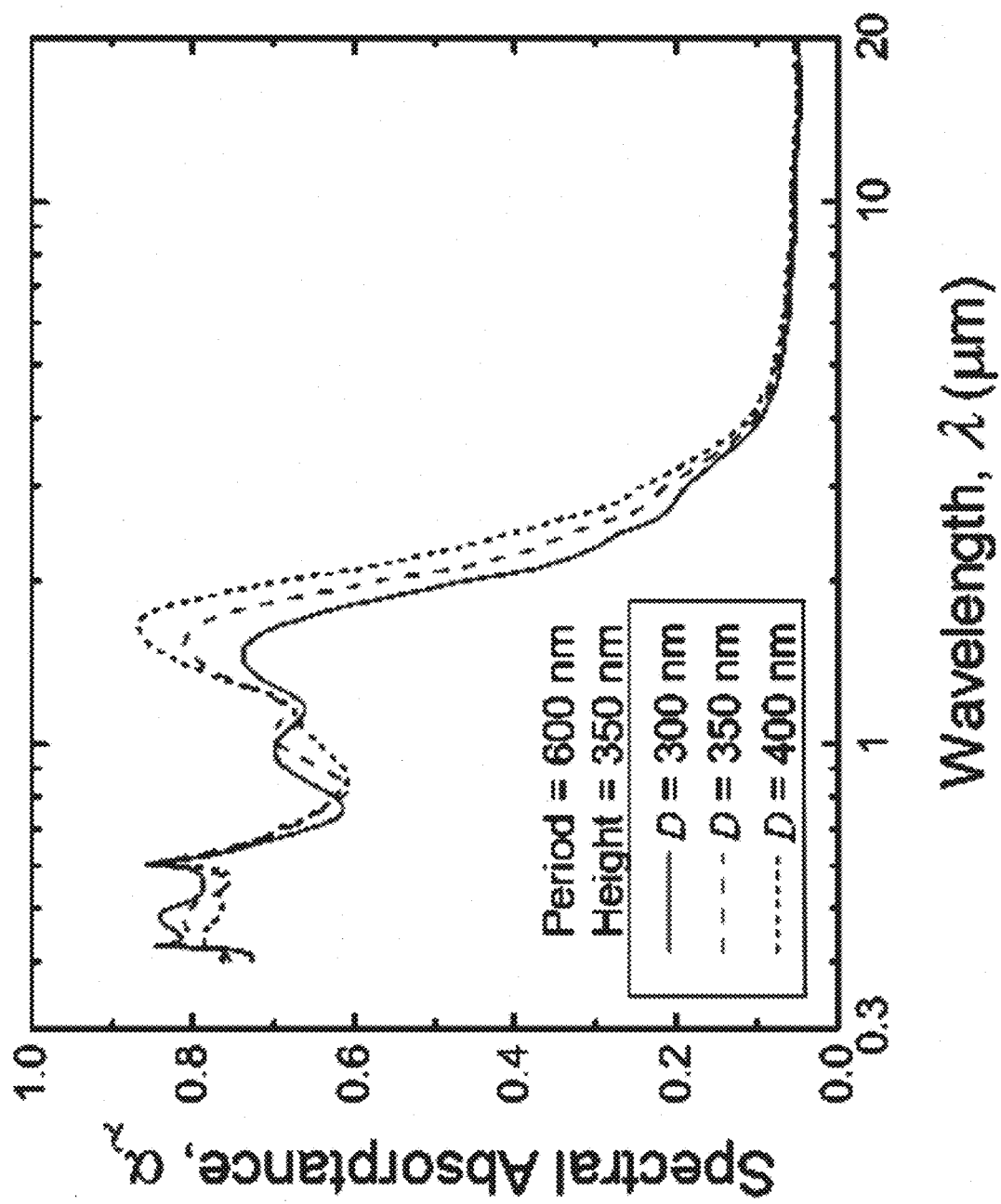
FIGS. 6A-6C show the influence of geometry on the spectral absorptance for an embodiment of the selective metamaterial absorber.
Figure 6B:
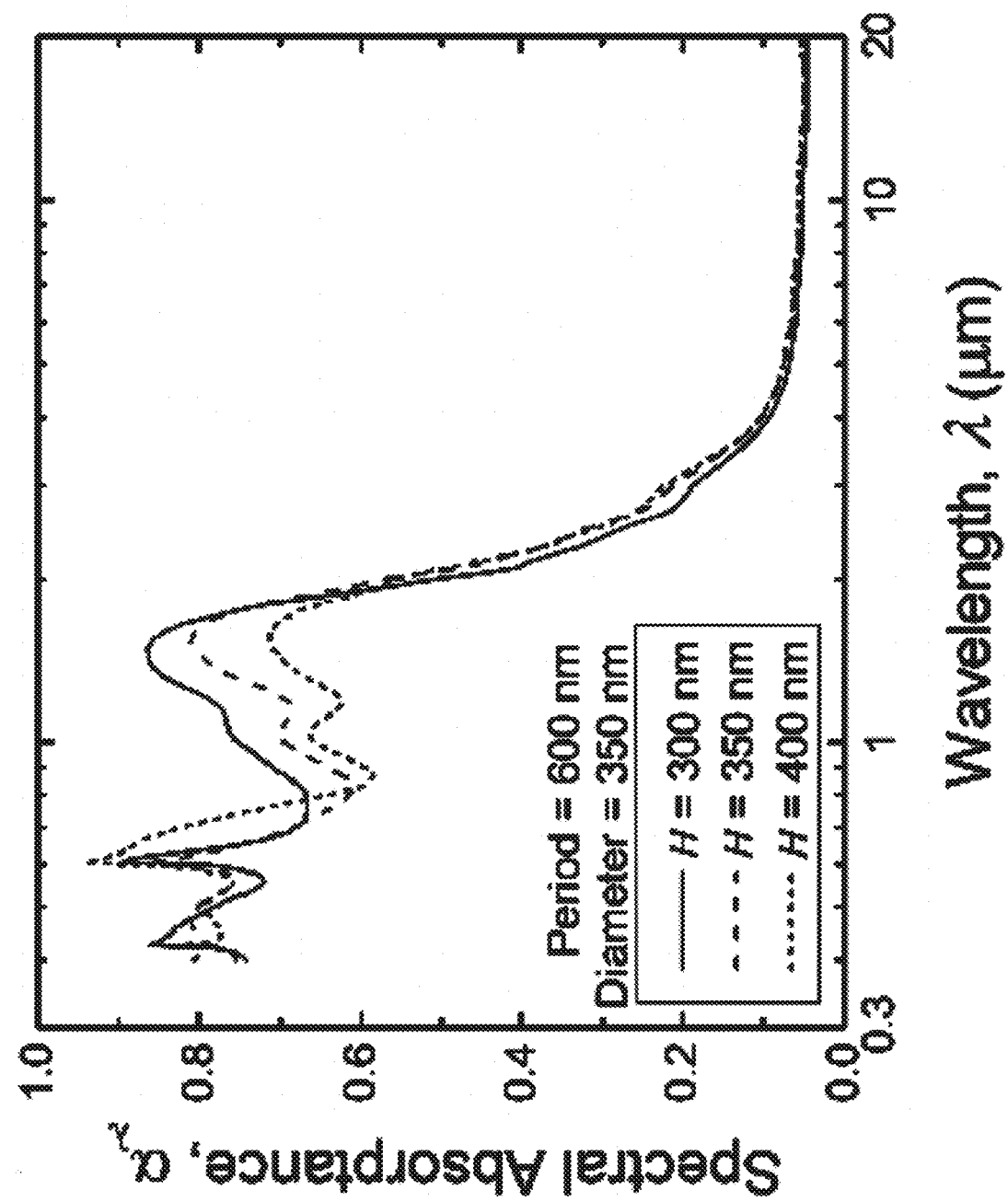
Figure 6C:
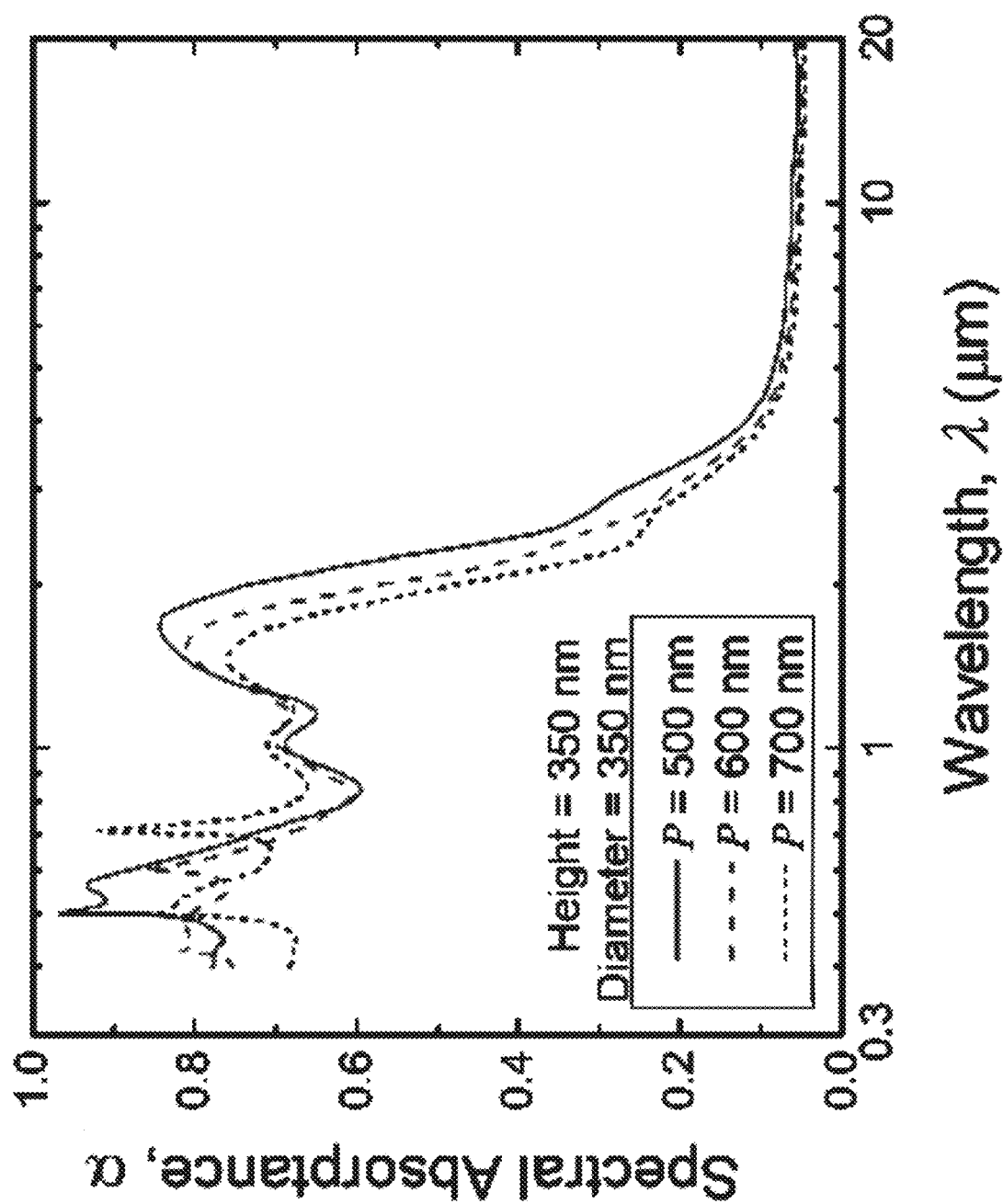

FIGS. 5A and 5B show the heat transfer analysis pie charts for the projected applications with both SiNW—Al and SMA+Al absorbers. The percentage of energy from the incident solar radiation that is converted into useful heat gain (crossed line shading), (i.e., solar-thermal efficiency), is increased to 78%-68% with SMA+Al from 63%-50% with the SiNW—Al absorber, for solar concentrations from 1.6 to 20 suns at the corresponding temperatures measured from the laboratory-scale solar-thermal tests. FIGS. 5C and 5D plot the projected solar-thermal efficiency as a function of absorber temperature at multiple solar concentrations for the SiNW—Al and SMA+Al absorbers, respectively. With the eliminated radiative losses from side and bottom surfaces, the efficiency for the projected application and the stagnation temperatures are increased compared with those discussed with respect to FIGS. 4A-4D. In particular, at solar concentration of 6.3 suns, the SMA+Al absorber could reach a stagnation temperature of 430° C., which is 125° C. higher than the SiNW—Al absorber, or 146° C. higher than a black absorber by virtue of the excellent spectral selectivity due to the 40-nm-thick conformal tungsten coating (i.e., first metal layer 102) of SMA+Al. Additional calculations also show that the SMA+Al absorber could achieve a stagnation temperature of 238° C. under unconcentrated solar irradiation (i.e., CF=1), which is more than 100° C. higher than the SiNW—Al or black absorbers and reach projected solar-thermal efficiency of 51% under the absorber temperature of 400° C. at 10 suns, at which neither the SiNW—Al nor black absorbers can obtain any net heat input FIGS. 6A-6C shows the influence of geometry on the simulated spectral absorptance for a specific embodiment of the contemplated metamaterial. Specifically, FIG. 6A examines the effect of varying the nanowire diameter 120, FIG. 6B examines the effect of varying the nanowire height, and FIG. 6C examines the effect of varying the period 122 of the nanowire array 112. As shown, the spectral absorptance is projected to, on average, increase with increasing nanowire diameter 120, decrease with increasing nanowire height, and decrease with increasing array period 122.

It will be understood that implementations are not limited to the specific components disclosed herein, as virtually any components consistent with the intended fabrication and/or operation of a silicon-cored tungsten nanowire selective metamaterial absorber may be utilized. Accordingly, for example, although particular silicon-cored tungsten nanowire selective metamaterial absorbers may be disclosed, the components may comprise any shape, size, style, type, model, version, class, grade, measurement, concentration, material, weight, quantity, and/or the like consistent with the intended operation and/or fabrication of a silicon-cored tungsten nanowire selective metamaterial absorber may be used. In places where the description above refers to particular implementations of silicon-cored tungsten nanowire selective metamaterial absorber, it should be readily apparent that a number of modifications may be made without departing from the spirit thereof and that these implementations may be applied to other selective absorbers.

Where the above examples, embodiments and implementations reference examples, it should be understood by those of ordinary skill in the art that other selective metamaterial absorbers and fabrication methods and examples could be intermixed or substituted with those provided. In places where the description above refers to particular embodiments of selective metamaterial absorbers and fabrication methods, it should be readily apparent that a number of modifications may be made without departing from the spirit thereof and that these embodiments and implementations may be applied to other metamaterial absorbers as well. Accordingly, the disclosed subject matter is intended to embrace all such alterations, modifications and variations that fall within the spirit and scope of the disclosure and the knowledge of one of ordinary skill in the art.

What is claimed is:

1. A selective metamaterial absorber, comprising:
a substrate comprising a first surface and a second surface opposite the first surface;
a plurality of nanowires extending outward from the first surface of the substrate, forming an array on the first surface; and
a first metal layer conformally deposed on the first surface and the plurality of nanowires, the first metal layer composed of a material having a penetration depth for a wavelength range of interest,
wherein the first metal layer is at least three times thicker than the penetration depth.

2. The absorber of claim 1, wherein the substrate and the plurality of nanowires are composed of silicon.

3. The absorber of claim 1, wherein the first metal layer is composed of tungsten.

4. The absorber of claim 1, further comprising a second metal layer on the second surface of the substrate, wherein the second metal layer is at least 200-nm thick.

5. The absorber of claim 1, wherein each nanowire of the plurality of nanowires has a diameter, wherein the array of nanowires has a period, and wherein the diameter is substantially equal to half the period.

6. The absorber of claim 4, wherein the second metal layer is composed of aluminum.

7. The absorber of claim 5, wherein the diameter of each nanowire of the plurality of nanowires is substantially equal to 275 nm.

8. The absorber of claim 5, wherein the period of the array of nanowires is substantially equal to 600 nm.

* * * * *